United States Patent
Yamanaka

(10) Patent No.: US 11,093,015 B2
(45) Date of Patent: Aug. 17, 2021

(54) IMAGING APPARATUS, ACCESSORY APPARATUS, CONTROL METHOD, AND STORAGE MEDIUM

(71) Applicant: CANON KABUSHIKI KAISHA, Tokyo (JP)

(72) Inventor: Tomoaki Yamanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/552,325

(22) Filed: Aug. 27, 2019

(65) Prior Publication Data
US 2020/0073462 A1    Mar. 5, 2020

(30) Foreign Application Priority Data

Sep. 3, 2018 (JP) .............................. JP2018-164778

(51) Int. Cl.
*G06F 1/3212*  (2019.01)
*G06F 1/3234*  (2019.01)
*G03B 17/14*  (2021.01)

(52) U.S. Cl.
CPC .......... *G06F 1/3212* (2013.01); *G03B 17/14* (2013.01); *G06F 1/325* (2013.01); *G03B 2217/007* (2013.01)

(58) Field of Classification Search
USPC ........................................................ 396/301
See application file for complete search history.

(56) References Cited

U.S. PATENT DOCUMENTS

2014/0089696 A1* 3/2014 Chen .................... G06F 1/3212
                                                  713/320
2020/0363605 A1* 11/2020 Saito .................... G02B 7/022

FOREIGN PATENT DOCUMENTS

| CN | 101150670 A | 3/2008 |
| CN | 101995738 A | 3/2011 |
| CN | 203241681 U | 10/2013 |
| CN | 105425559 A | 3/2016 |

(Continued)

OTHER PUBLICATIONS

Extended European Search Report issued in European Appln. No. 19194883.5 dated Jan. 28, 2020.

(Continued)

*Primary Examiner* — Rodney E Fuller
(74) *Attorney, Agent, or Firm* — Rossi, Kimms & McDowell LLP

(57) ABSTRACT

An imaging apparatus to which an accessory apparatus is detachably and communicatively attachable. The imaging apparatus comprises a power supply unit configured to supply a power to the accessory apparatus; a camera control unit configured to control the power supply unit; and a camera communication unit configured to communicate with the accessory apparatus, wherein the camera communication unit receives, from the accessory apparatus, one or more settable power modes settable to the accessory apparatus and transmits, to the accessory apparatus, a request power mode corresponding to a power that the power supply unit can supply to the accessory apparatus, and wherein when one of the settable power modes corresponds to the request power mode, the power supply unit supplies the power corresponding to the request power mode.

13 Claims, 7 Drawing Sheets

(56) References Cited

FOREIGN PATENT DOCUMENTS

| | | |
|---|---|---|
| JP | H1164957 A | 3/1999 |
| JP | 2014228588 A | 12/2014 |
| JP | 6173034 B2 | 8/2017 |

OTHER PUBLICATIONS

Office Action issued in Chinese Appln. No. 201910826769.1 dated Mar. 22, 2021. English translation provided.

* cited by examiner

| MODE NO. | PERMISSIBLE CONSUMPTION POWER | DESCRIPTION |
|---|---|---|
| LENS POWER MODE1 | 0.5W | FUNCTION LIMITED POWER STATE |
| LENS POWER MODE2 | 1.0W | LOW CONSUMPTION POWER STATE |
| LENS POWER MODE3 | 2.0W | NORMAL OPERATION POWER STATE |
| LENS POWER MODE4 | 3.0W | HIGH SPECIFICATION OPERATION POWER STATE |

FIG. 2

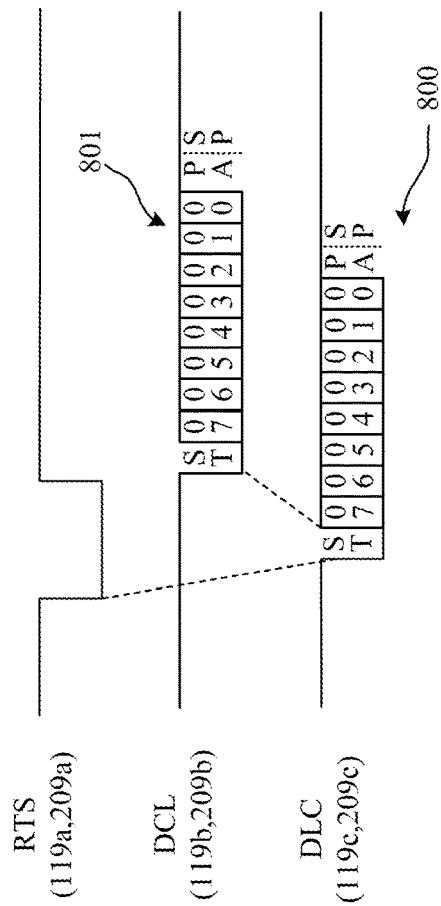
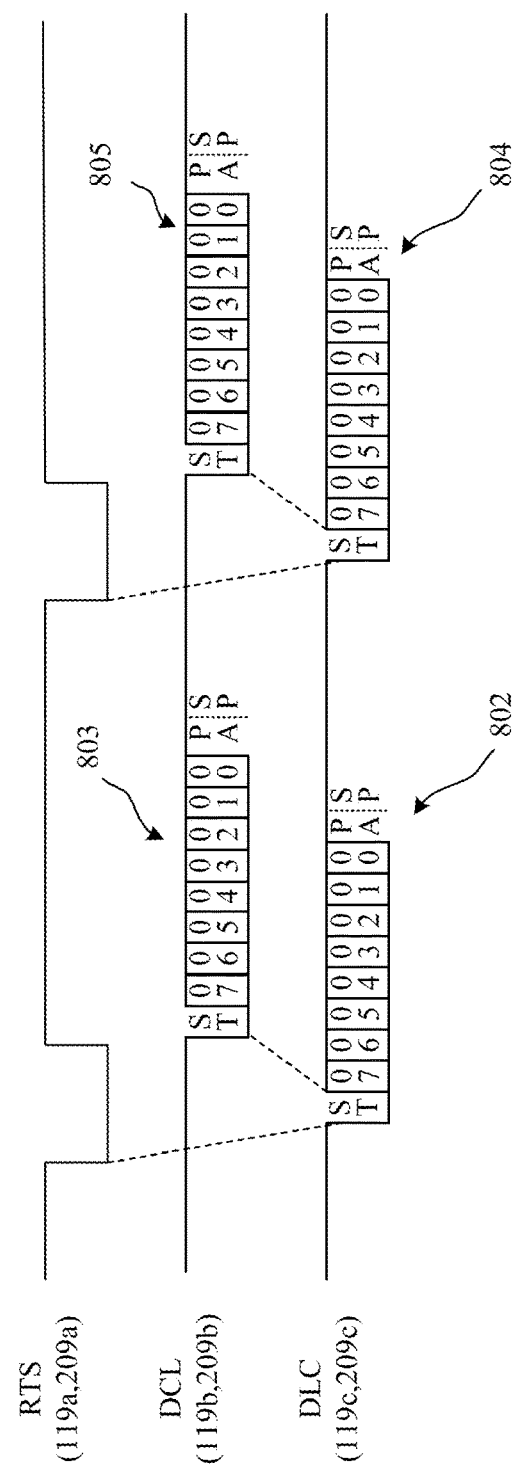
FIG. 6A
FIG. 6B

IMAGING APPARATUS, ACCESSORY APPARATUS, CONTROL METHOD, AND STORAGE MEDIUM

BACKGROUND OF THE INVENTION

Field of the Invention

The present invention relates to an imaging apparatus to which an accessory apparatus, such as an interchangeable lens, is detachably attached.

Description of the Related Art

The interchangeable lens, which is an accessory apparatus of the imaging apparatus, includes actuator s for driving a focus lens, a magnification varying lens, and a diaphragm, and a control circuit configured to control them, and operates the actuators and control circuit using the power supplied from the battery of the imaging apparatus. In this case, when the interchangeable lens consumes the power excessively in a low battery residue of the imaging apparatus, the voltage rapidly drops in the imaging apparatus and the imaging operation is unavailable. Thus, the interchangeable lens is required to operate within a range of power that can be supplied from the imaging apparatus.

Japanese Patent Laid-Open No. 11-64957 discloses an imaging system in which an interchangeable lens transmits a power consumption level of the interchangeable lens to an imaging apparatus, and the imaging apparatus determines the power supplied to the interchangeable lens based on the state of its own battery and the power consumption level received from the interchangeable lens.

It is desirable that the imaging apparatus and the interchangeable lens start up and become ready for imaging as quickly as possible from the shutdown states. The imaging apparatus and the interchangeable lens are often used where the power that can be supplied and the consumed power are different from each other. Hence, in order for the imaging apparatus and the interchangeable lens to operate within the range of power that can be supplied by the battery of the imaging apparatus, the power that can be supplied to the interchangeable lens by the imaging apparatus and the power consumed by the interchangeable lens need to be properly set.

SUMMARY OF THE INVENTION

The present invention provides an imaging apparatus and an accessory apparatus, each of which can quickly start up, and properly set the operating power of the accessory apparatus for the power that the imaging apparatus can supply to the accessory apparatus.

An imaging apparatus according to one aspect of the present invention to which an accessory apparatus is detachably and communicatively attachable comprises a power supply unit configured to supply a power to the accessory apparatus, a camera control unit configured to control the power supply unit, and a camera communication unit configured to communicate with the accessory apparatus, wherein the camera communication unit receives, from the accessory apparatus, one or more settable power modes settable to the accessory apparatus and transmits, to the accessory apparatus, a request power mode corresponding to a power that the power supply unit can supply to the accessory apparatus, and wherein when one of the settable power modes corresponds to the request power mode, the power supply unit supplies the power corresponding to the request power mode.

An accessory apparatus according to one aspect of the present invention detachably and communicatively attachable to an imaging apparatus comprises a power receiving unit configured to receive a power from the imaging apparatus, an accessory control unit configured to control an operation of the accessory apparatus, and an accessory communication unit configured to communicate with the imaging apparatus, wherein the accessory communication unit transfers, to the imaging apparatus, one or more settable power modes settable to the accessory apparatus, and receives, from the imaging apparatus, a request power mode corresponding to a power that the imaging apparatus can supply to the accessory apparatus, and wherein when any one of the one or more settable power modes corresponds to the request power mode, the accessory control unit operates the accessory apparatus under one of the one or more settable power modes corresponding to the request power mode.

A control method according to another aspect of the present invention of an imaging apparatus to which an accessory apparatus is detachably and communicatively attachable comprises the steps of receiving, from the accessory apparatus, one or more settable power modes settable to the accessory apparatus and transmitting, to the accessory apparatus, a request power mode corresponding to a power that the imaging apparatus can supply to the accessory apparatus, and supplying the power corresponding to the request power mode, when one of the settable power modes corresponds to the request power mode.

A control method according to another aspect of the present invention of an accessory apparatus detachably and communicatively attachable to an imaging apparatus comprises the steps of transferring, to the imaging apparatus, one or more settable power modes settable to the accessory apparatus and receiving, from the imaging apparatus, a request power mode corresponding to a power that the imaging apparatus can supply to the accessory apparatus, and operating the accessory apparatus under one of the one or more settable power modes corresponding to the request power mode, when any one of the one or more settable power modes corresponds to the request power mode.

A non-transitory computer-readable storage medium storing a computer program for causing a computer to execute the above control method also constitutes another aspect of the present invention.

Further features of the present invention will become apparent from the following description of exemplary embodiments with reference to the attached drawings.

BRIEF DESCRIPTION OF THE DRAWINGS

FIG. 2 illustrates an illustrative lens power mode according to the first embodiment.

FIGS. 6A and 6B illustrate data transmission and reception.

DESCRIPTION OF THE EMBODIMENTS

Referring now to the accompanying drawings, a description will be given of embodiments according to the present invention.

First Embodiment

Figure 1:
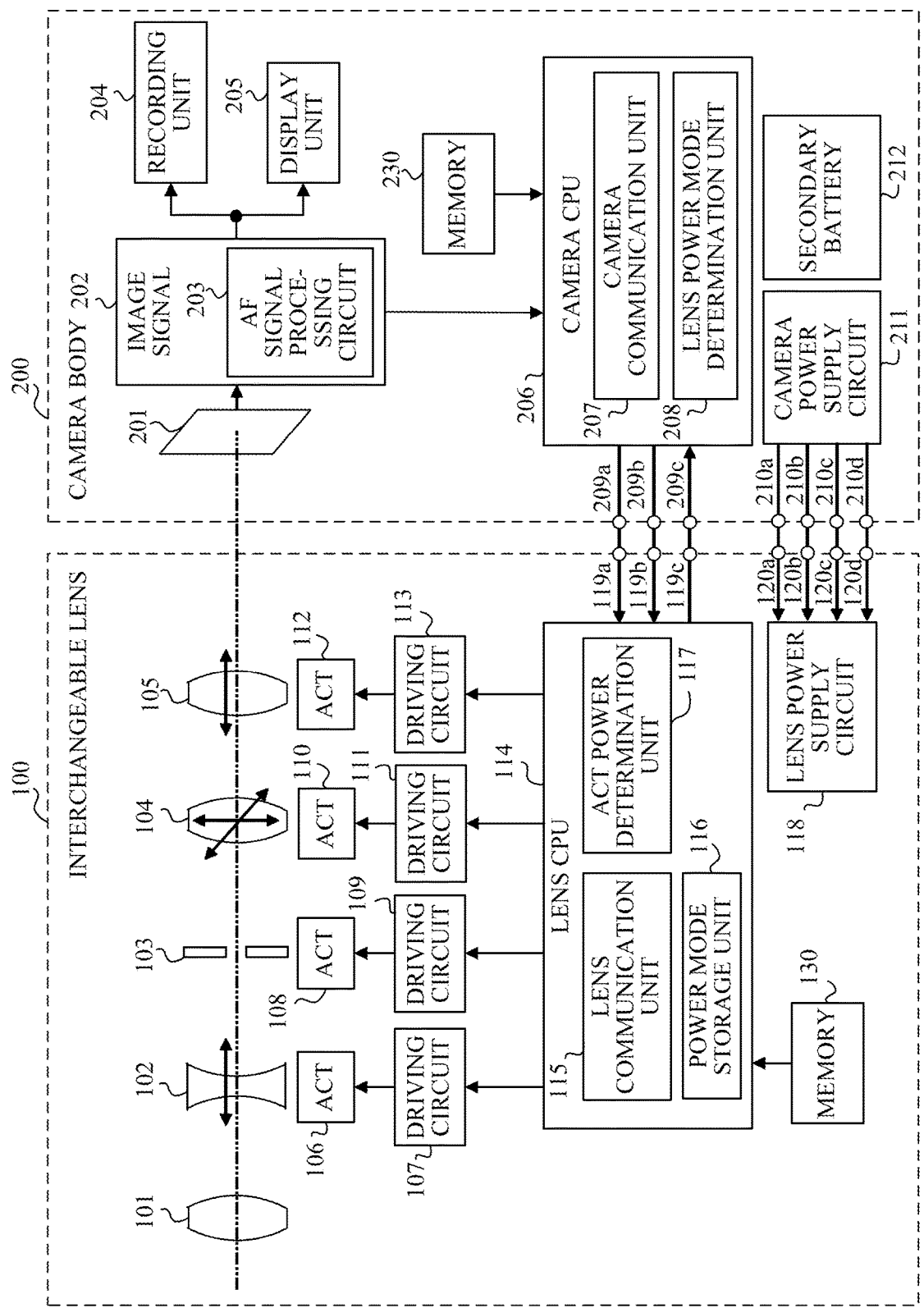
FIG. 1 is a block diagram showing a configuration of a lens interchangeable type imaging system according to a first embodiment.

FIG. 1 illustrates a configuration of a lens interchangeable type imaging system including an interchangeable lens 100 as an accessory apparatus according to a first embodiment of the present invention, and an imaging apparatus (referred to as a camera body hereinafter) 200 to which the interchangeable lens 100 is detachably attached.

In the interchangeable lens 100, the imaging optical system includes, in order from an object side to an image side, a fixed front lens 101, a magnification varying lens 102, a diaphragm 103, an image stabilization (image blur correction) lens 104, and a focus lens 105. Each of the lenses 101, 102, 104, and 105 includes one lens element in FIG. 1, but may actually include one or more lens elements.

The magnification varying lens 102 is an optical element of at least part of the imaging optical system, and is driven in the optical axis direction of the imaging optical system by a zoom actuator 106 that includes a stepping motor, a DC motor, or the like. Thereby, the interchangeable lens 100 varies a magnification of the imaging optical system. A zoom driving circuit 107 supplies a driving voltage and current to a zoom actuator 106. The diaphragm 103 changes the aperture diameter through an aperture actuator 108 that includes a stepping motor, a DC motor, or the like. A diaphragm driving circuit 109 supplies a driving voltage and current to the diaphragm actuator 108.

The image stabilization lens 104 is driven in a shift direction orthogonal to the optical axis direction by the image stabilization actuator 110 that includes a stepping motor, a voice coil motor or the like to reduce (correct) an image blur. An image stabilization driving circuit 111 supplies a driving voltage and current to the image stabilization actuator 110. The focus lens 105 is driven for focusing in the optical axis direction by a focus actuator 112 that includes a stepping motor, a voice coil motor or the like. A focus driving circuit 113 supplies a driving voltage and current to the focus actuator 112. The zoom driving circuit 107, the diaphragm driving circuit 109, the image stabilization driving circuit 111, and the focus driving circuit 113 are collectively referred to as an actuator driving circuit in the following description.

As illustrated in FIG. 1, when the interchangeable lens 100 is mounted on the camera body 200, electric contacts 119a, 119b, and 119c provided on the interchangeable lens 100 and electric contacts 209a, 209b, and 209c provided on the camera body 200 are connected with each other. Thereby, various information is communicated between the interchangeable lens 100 and the camera body 200. FIG. 1 illustrates the interchangeable lens 100 and the camera body 200 perform three-wire serial communication. The communication method will be described later.

Since power supply contacts 120a, 120b, 120c, and 120d provided on the interchangeable lens 100 and power supply contacts 210a, 210b, 210c, and 210d provided on the camera body 200 are connected to each other, a power is supplied from the camera body 200 to the interchangeable lens 100.

The power supply contacts 120a and 210a are power supply terminals for supplying the power to a variety of types of sensors provided on the interchangeable lens 100 and the lens CPU 114, and the power supply contacts 120b and 210b are ground terminals of the power supply. The power supply contacts 120c and 210c are power supply terminals for supplying the power to the actuator driving circuits 107, 109, 111, and 113 provided in the interchangeable lens 100, and the power supply contacts 120d and 210d are ground terminals of the power source. A power supply from a secondary battery 212, such as a lithium ion battery, mounted on the camera body 200 is converted into a predetermined voltage by a camera power supply circuit (power supply unit) 211 including a DC-DC converter and the like, and supplied to the interchangeable lens 100 via the power supply contact. A lens power supply circuit (power receiving unit) 118 provided in the interchangeable lens 100 includes a DC-DC converter or the like, converts a voltage supplied from the camera power supply circuit 211 into a voltage suitable for each of various sensors and actuator driving circuits and distributes the power to them.

The camera body 200 includes an image sensor 201 as a photoelectric conversion element, such as a CCD sensor and a CMOS sensor. The image sensor 201 photoelectrically converts an optical image (object image) formed on the imaging surface by the imaging optical system. The charge accumulated in the image sensor 201 by the photoelectric conversion is output as an imaging signal (analog signal) at a predetermined timing, and input to an image signal processing circuit 202.

The image signal processing circuit 202 converts an analog imaging signal from the image sensor 201 into a digital imaging signal, and performs various signal processing, such as an amplification and a gamma correction, for the digital imaging signal to generate an image signal. The image signal is output to a camera CPU 206, a display unit 205, such as a liquid crystal display panel, and a recording unit 204, such as an optical disc and a semiconductor memory.

The image signal processing circuit 202 includes an AF signal processing circuit 203 as a focus information generation unit. The AF signal processing circuit 203 extracts a high frequency component and a luminance component obtained by the pixel group in the AF area as a focus detection area from the imaging signal (or the image signal generated using the imaging signal) output from the image sensor 201, and generates a focus evaluation value signal as focus information. The focus evaluation value signal indicates a contrast state (imaging contrast) of the captured image or the sharpness, and changes as the focus lens 105 moves. 1 of the focus lens 105 at which the focus evaluation value signal or the focus evaluation value has a maximum value or peak represents the position of the focus lens 105 or in-focus position where the in-focus state is obtained at the AF area.

The camera CPU (camera control unit, camera communication unit) 206 includes a camera communication unit 207 and a lens power mode determination unit 208. The camera communication unit 207 communicates various information with the lens CPU 114 via the electric contacts 119a to 119c and 209a to 209c described above. The information communicated herein includes a lens power mode transmitted from the lens CPU 114 to the camera CPU 206, which is a power mode settable by the interchangeable lens 100. The information further includes a predetermined power mode (lens power mode instructed by camera) or the like transmitted from the camera CPU 205 to the lens CPU 114 and notified to the interchangeable lens 100 by the camera CPU 205.

The lens power mode determination unit 208 determines a power mode (request power mode: referred to as a lens power mode instructed by camera hereinafter) instructed to the interchangeable lens 100. The lens power mode instructed by camera is determined according to the power that can be supplied from the camera power source circuit 211 to the interchangeable lens 100 without impairing the operation of the camera body 200 or the power that can be consumed by the interchangeable lens 100.

The camera CPU 206 controls the power supplied from the camera power supply circuit 211 to the interchangeable lens 100.

The lens CPU (accessory control unit, accessory communication unit) 114 includes a lens communication unit 115, a power mode storage unit 116, and an actuator (ACT) power determination unit 117. The lens communication unit 115 communicates various information with the camera CPU 206 via the above electric contacts 119a to 119c and 209a to 209c. The power mode storage unit 116 stores a lens power mode (settable power state) with which the interchangeable lens 100 is compatible or a power mode which the interchangeable lens 100 can set. The lens power mode will be described later. The ACT power determination unit 117 determines the powers consumed by the actuators 106, 108, 110, and 112 in accordance with the lens power mode instructed by camera received from the camera body 200 (camera CPU 206).

FIG. 2 illustrates an illustrative lens power mode. FIG. 2 illustrates a lens power mode for the powers supplied to the actuator driving circuits 107, 109, 111, and 113 having a large power consumption.

A lens power mode 1 is a function limited power state that suppresses the power consumption by limiting the function of the interchangeable lens 100, such as stopping the image stabilization function and lowering the driving speed of the focus actuator 112 (focus lens 105). A lens power mode 2 is a low power consumption state in which the power consumption is reduced by limiting the driving speed and the movable range of each of the actuators 106, 108, 110, and 112, although the function of the interchangeable lens 100 is not stopped. Since the power consumption reducing method of an actuator is known, a description thereof will be omitted.

A lens power mode 3 is a normal operation power state where the actuators 106, 108, 110, and 112 can be normally driven without stopping or limiting the function of the interchangeable lens 100. A lens power mode 4 is a high specification operation power state that improves the function of the interchangeable lens 100 by increasing the power supplied to each actuator (for example, by increasing the applied voltage) in addition to the normal driving of the actuators 106, 108, 110, and 112. This lens power mode 4, for example, can enlarge a shiftable area of the image stabilization lens 104 to correct a larger image blur, or increase the driving speed of the focus lens 105 in the autofocus or the magnification varying lens 102 in the power zoom.

The power mode storage unit 116 stores one or more lens power modes settable by the interchangeable lens 100 among these lens power modes 1 to 4 correlated with a permissible power consumption (such as 0.5 W, 1.0 W, 2.0 W, 3.0 W). If the lens CPU 114 knows the correlation with the permissible power consumption in each lens power mode, the power mode storage unit 116 may store only the lens power mode or the permissible power consumption instead of the lens power mode. The lens CPU 114 transmits the lens power mode (or permissible power consumption) stored in the power mode storage unit 116 to the camera CPU 206 via the lens communication unit 115.

Referring now to FIGS. 6A and 6B, a description will be given of a communication method of transmitting one or more lens power modes settable by the interchangeable lens 100 from the lens CPU 114 to the camera CPU 206 and of notifying the lens CPU 114 of the lens power mode instructed by camera from the camera CPU 206.

As described above, a communication is made between the camera CPU 206 and the lens CPU 114 via the electric contacts 119a to 119c and 209a to 209c. A notice channel RTS is formed by the electric contacts 119a and 209a. The notice channel RTS serves as a channel for requesting the lens CPU 114 to start a communication from the camera CPU 206. The camera CPU 206 controls the voltage level of the notice channel RTS. A data communication channel DCL for transmitting data from the camera CPU 206 to the lens CPU 114 is formed via the electric contacts 110b and 209b, and a data communication channel DLC for transmitting data from the lens CPU 114 to the camera CPU 206 via the electric contacts 109c and 209c.

The communication is made between the camera CPU 206 and the lens CPU 114 by the asynchronous communication as illustrated in FIGS. 6A and 6B. The lens CPU 114 transmits data 800 to the camera CPU 206 via the data communication channel DLC when the lens CPU 114 detects a change from High to Low of the voltage level of the notice channel RTS in the asynchronization communication according to this embodiment. The camera CPU 206 is configured to communicate data 801 to the lens CPU 114 via the data communication channel DCL in response to a detection of the start bit ST of the data received from the lens CPU 114 via the data communication channel DLC. The camera CPU 206 is configured to change the voltage level of the notice channel RTS from Low to High in transmitting the data 801.

FIG. 6A illustrates a protocol that transmits the settable lens power mode to the camera CPU 206 in the first communication after the interchangeable lens 100 is attached to the camera body 200. In this case, the camera CPU 206 does not need the request notice of the lens power mode. Hence, as the voltage level of the notice channel RTS changes from High to Low, the lens CPU 114 transmits one or more lens power modes as the data 800 to the camera CPU 206. The camera CPU 206 transmits the lens power mode instructed by camera determined by the lens power mode determination unit 208, to the lens CPU 114 as the data 801.

FIG. 6B illustrates no protocol that transmits the settable lens power mode to the camera CPU 206 in the first communication after the interchangeable lens 100 is mounted on the camera body 200. In this case, the camera CPU 206 requests the lens CPU 114 to transmit the lens power mode. First, data 802 transmitted by the lens CPU 114 to the camera CPU 206 in response to a change in voltage level of the notice channel RTS is a signal of data receivable from the camera CPU 206. As the start bit ST of the data 802 is detected, the camera CPU 206 transmits, as data 803, data to the lens CPU 114 to request a transmission of the lens power mode. Next, as the voltage level of the notice channel RTS changes, the lens CPU 114 transmits as data 804 the settable lens power mode to the camera CPU 206. The camera CPU 206 transmits as data 805 the lens power mode instructed by camera determined by the lens power mode determination unit 208 to the lens CPU 114.

As described above, in this embodiment, the camera CPU 206 transmits the lens power mode instructed by camera to the lens CPU 113 before the content of the lens power mode transmitted from the lens CPU 114 is completely interpreted.

Figure 3:
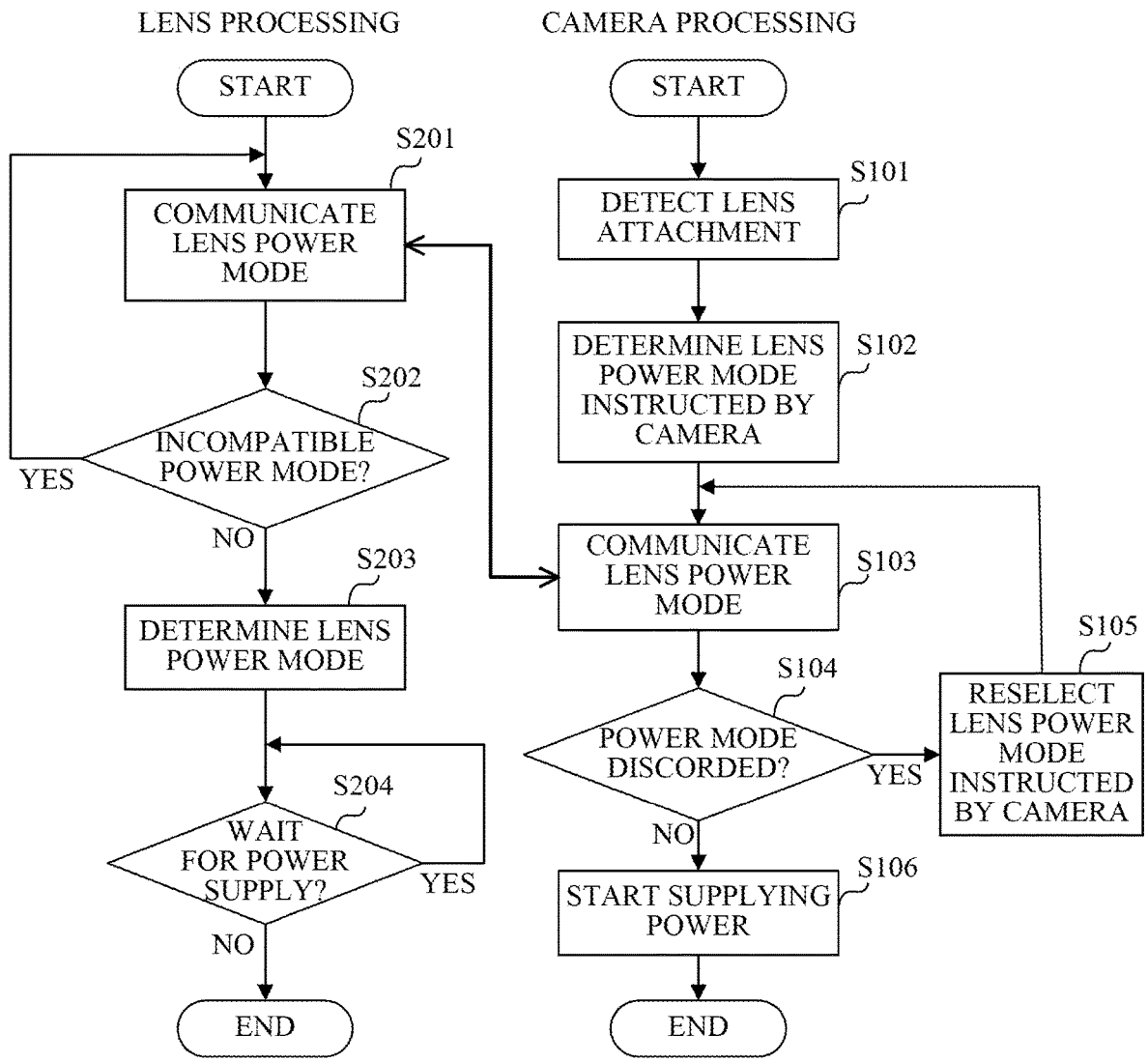
FIG. 3 is a flowchart showing processing performed by the interchangeable lens and the camera body according to the first embodiment.

Referring now to a flowchart of FIG. 3, a description will be given of startup processing (control method) performed by the camera CPU 206 and the lens CPU 114 according to this embodiment. The camera body 200 and the interchangeable lens 100 have memories 230 and 130 each configured to store a computer program. The camera CPU 206 and the lens CPU 114 read computer programs from the memories 230 and 130, respectively, and perform the main startup processing according to the program.

When the camera body 200 is powered on, the camera CPU 206 and the lens CPU 114 each start this processing.

A description will now be given of processing performed by the lens CPU 114. In the step S201, the lens CPU 114 reads out of the power mode storage unit 116 one or more lens power modes settable by the interchangeable lens 100, and transmits them to the camera CPU 206. The lens CPU 114 receives a lens power mode instructed by camera from the camera CPU 206.

Next, in the step S202, the lens CPU 114 determines whether the lens power mode instructed by camera received from the camera CPU 206 in the step S201 corresponds to any one of the one or more lens power modes stored in the lens power mode storage unit 116. In other words, the CPU 114 determines whether or not the interchangeable lens 100 has received an incompatible (non-settable) lens power mode instructed by camera. If the lens power mode instructed by camera does not correspond to any of the lens power modes, the lens CPU 114 returns to the step S201 and waits for a notice of the lens power mode instructed by camera that corresponds to any one of the lens power modes from the camera CPU 206 (step S202). On the other hand, when the lens power mode instructed by camera corresponds to any one of the lens power modes, the lens CPU 114 proceeds to the step S203.

In the step S203, the lens CPU 114 determines the lens power mode to be used by the interchangeable lens 100. For example, when the lens power mode 4 (high specification operation power state) illustrated in FIG. 2 is instructed, the setting for improving the function of the interchangeable lens 100 is performed as described above.

In the subsequent step S204, the lens CPU 114 waits for the power supply start from the camera body 200. This is because, when the actuator driving circuit in the interchangeable lens 100 can drive the actuator, there is no power supply, the power supply starts, an overcurrent flows in the actuator and the lens power supply circuit 118 or the actuator may get damaged. When the power supply starts, the lens CPU 114 ends this processing.

Next follows a description of processing performed by the camera CPU 206. In the step S101, the camera CPU 206 detects whether the interchangeable lens 100 is attached to the camera body 200. This detection can be performed by detecting the energization through the above electric contacts or by mounting a dedicated electric contact or a sensor for the lens attachment detection.

In the next step S102, the camera CPU 206 determines the lens power mode instructed by camera for the interchangeable lens 100 through the lens power mode determination unit 208. In the next step S103, the camera CPU 206 notifies the lens CPU 114 of the lens power mode instructed by camera determined in step S102, and receives one or more lens power modes from the lens CPU 114.

In the next step S104, the camera CPU 206 determines whether the lens power mode instructed by camera determined by the lens power mode determination unit 208 corresponds to the lens power mode received in the step S103. When the lens power mode instructed by camera and the lens power mode correspond to each other, the camera CPU 206 proceeds to the step S106.

On the other hand, when the lens power mode instructed by camera and the lens power mode do not correspond to each other, the camera CPU 206 cannot supply the power to the interchangeable lens 100 as it is. Hence, the flow proceeds to the step S105 to reselect (set) the lens power mode instructed by camera that corresponds to the lens power mode received in the step S103. The flow returns to the step S103 to notify the lens CPU 114 of the reset lens power mode instructed by camera.

In the step S106, the camera CPU 206 starts supplying the power corresponding to the lens power mode instructed by camera that corresponds to the lens power mode from the camera power source circuit 211 to the lens power source circuit 118. Then, this flow ends.

The above processing can make the lens power mode and the lens power mode instructed by camera correspond to each other by transmitting and receiving the power mode between the camera body 200 and the interchangeable lens 100 at most twice. As one condition to make these power modes correspond to each other, it is necessary to previously arrange that at least one of the one or more lens power modes correspond to at least one of the power modes which the camera body 200 can permit (instruct) to the interchangeable lens 100.

According to this embodiment, when the interchangeable lens 100 is attached to the camera body 200, the camera body 200 notifies the interchangeable lens 100 of the lens power mode instructed by camera. The interchangeable lens 100 receives the power corresponding to the lens power mode from the camera body 200, when the lens power mode instructed by camera corresponds to any one of the lens power modes settable itself. If the lens power mode instructed by camera does not correspond to any one of the lens power modes settable by the interchangeable lens 100, the camera body 200 resets the lens power mode instructed by camera that corresponds to any one of the lens power modes. Thereby, the operation power state of the interchangeable lens 100 can be properly set in the power supply range permissible by the camera body 200, while the imaging system is quickly ready for imaging after it is started up.

Second Embodiment

Figure 4:
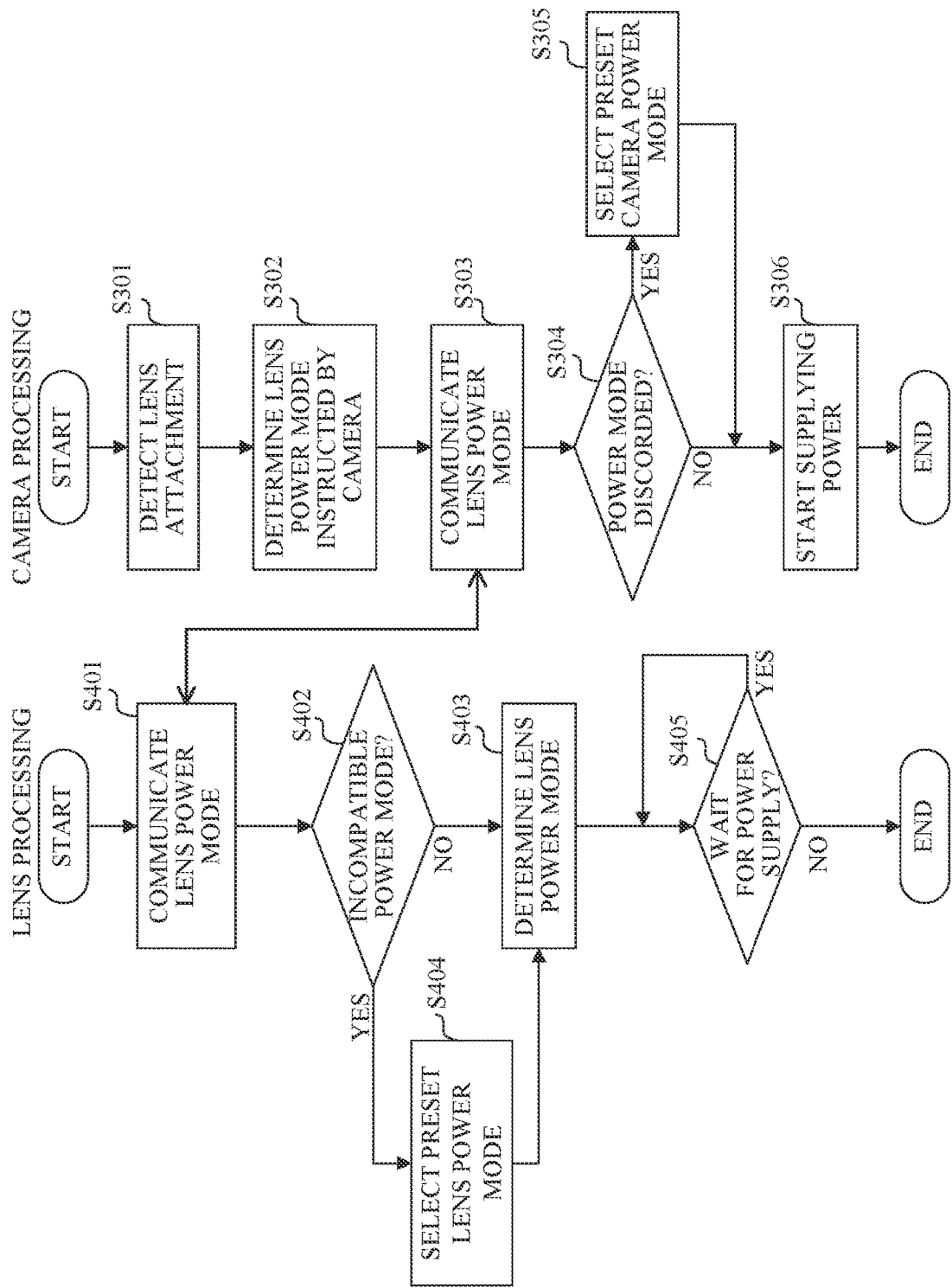
FIG. 4 is a flowchart showing processing performed by the interchangeable lens and the camera body according to a second embodiment.

Referring now to a flowchart in FIG. 4, a description will be given of startup processing according to a second embodiment of the present invention that sets a power mode for the interchangeable lens 100 when there is no prearrangement of making the power modes correspond to each other between the camera body 200 and the interchangeable lens 100. The configurations of the camera body 200 and the interchangeable lens 100 according to this embodiment are the same as those in the first embodiment, and the components common to those in the first embodiment will be designated by the same reference numerals as those in the first embodiment. When the camera body 200 is powered on, the camera CPU 206 and the lens CPU 114 each start this processing.

First, processing performed by the lens CPU 114 will be described. In the step S401, the lens CPU 114 reads one or more lens power modes settable by the interchangeable lens 100 out of the power mode storage unit 116, and transmits them to the camera CPU 206. The lens CPU 114 receives the lens power mode instructed by camera from the camera CPU 206.

Next, in the step S402, the lens CPU 114 determines whether the lens power mode instructed by camera received from the camera CPU 206 in the step S401 corresponds to any one of the one or more lens power modes stored in the lens power mode storage unit 116. In other words, the CPU 114 determines whether or not the interchangeable lens 100 has received an incompatible (non-settable) lens power mode instructed by camera. If the camera command power mode does not correspond to any of the lens power modes, the lens CPU 114 proceeds to S404. On the other hand, if the lens power mode instructed by camera corresponds to any of the lens power modes, the lens CPU 114 proceeds to the step S403.

In the step S404, the lens CPU 114 uniquely sets a preset lens power mode (predetermined settable power state). The preset lens power mode may be a minimum necessary operation power state that does not cause the overcurrent to be generated in the camera power supply circuit 211 in the camera body 200 as the operation power state of the interchangeable lens 100. However, if the function of the interchangeable lens 100 is limited, the imaging operation desired by the user may be disturbed. Thus, the lens CPU 114 may select (determine) the lens power mode 2 (low power consumption state) illustrated in FIG. 2 as the preset lens power mode. Thereafter, the lens CPU 114 proceeds to the step S405.

On the other hand, in the step S403, the lens CPU 114 determines the lens power mode instructed by camera received from the camera CPU 206 in the step S401 as a lens power mode used by the interchangeable lens 100. Thereafter, the lens CPU 114 proceeds to the step S405.

In the step S405, the lens CPU 114 waits for the power supply start from the camera body 200, similar to the step S204 in the first embodiment, and ends the processing when the power supply starts.

Next follows a description of processing performed by the camera CPU 206. In the step S301, the camera CPU 206 detects whether the interchangeable lens 100 is attached to the camera body 200 similar to the step S101 in the first embodiment.

Next, in the step S302, the camera CPU 206 determines the lens power mode instructed by camera for the interchangeable lens 100 through the lens power mode determination unit 208. Then, in the next step S303, the camera CPU 206 notifies the lens CPU 114 of the lens power mode instructed by camera determined in the step S302, and receives one or more lens power modes from the lens CPU 114.

Next, in the step S304, the camera CPU 206 determines whether the lens power mode instructed by camera determined by the lens power mode determination unit 208 corresponds to the lens power mode received in the step S303. If the lens power mode instructed by camera and the lens power mode correspond to each other, the camera CPU 206 proceeds to the step S306. On the other hand, if the lens power mode instructed by camera and the lens power mode do not correspond to each other, the camera CPU 206 cannot supply the power to the interchangeable lens 100 as it is, so the flow proceeds to the step S305.

In the step S305, the camera CPU 206 selects (sets) as a lens power mode instructed by camera a default power mode (predetermined power supply state: referred to as a preset camera power mode hereinafter) previously stored in the camera CPU 206. Since the power consumed by the interchangeable lens 100 is unknown, this preset camera power mode should be a power mode that supplies as the predetermined power the maximum power that can be supplied by the secondary battery 212 and the camera power source circuit 211. Thereafter, the camera CPU 206 proceeds to the step S306.

In the step S306, the camera CPU 206 starts supplying the power from the camera power source circuit 211 to the lens power source circuit 118, which corresponds to the lens power mode instructed by camera that corresponds to the lens power mode in the step S304 or the preset camera power mode set in the step S305. Then, the processing ends.

According to this embodiment, the interchangeable lens 100 sets a preset lens power mode suitable for itself when there is no lens power mode that corresponds to the lens power mode instructed by camera, and sets a preset camera power mode in which the camera body 200 supplies the proper power to the interchangeable lens 100. Thereby, the operation power state of the interchangeable lens 100 can be properly set in the power supply range that is permissible by the camera body 200, while the imaging system is quickly ready for imaging after it is started up.

While this embodiment has been described separately from the first embodiment, the processing according to this embodiment is applicable to an irregular situation, such as an abnormal communication between the camera body 200 and the interchangeable lens 100 in the first embodiment. For example, the camera CPU 206 sets the preset camera power mode described in this embodiment when there are three or more power mode discordances in the step S104 in the first embodiment. The lens CPU 114 sets the preset lens power mode described in this embodiment when it receives three or more incompatible lens power mode instructed by cameras in the step S204 in the first embodiment.

Third Embodiment

Figure 5:
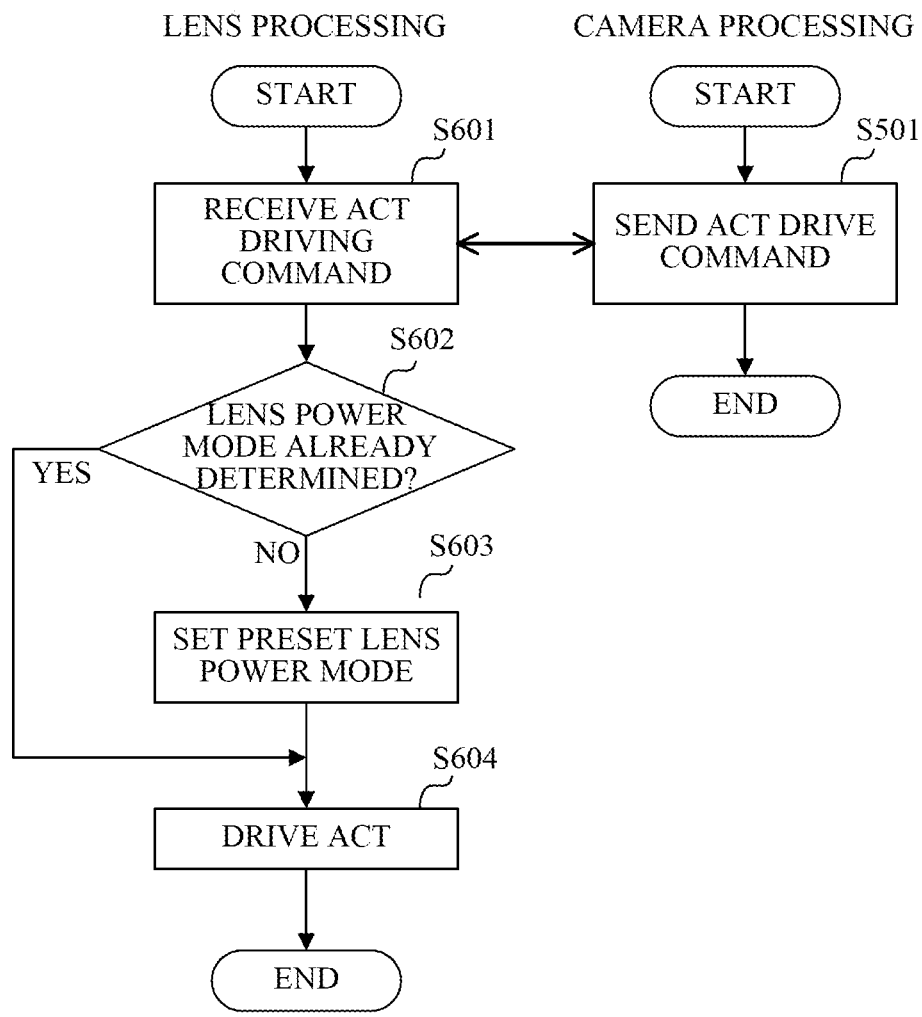
FIG. 5 is a flowchart showing processing performed by the interchangeable lens and the camera body according to a third embodiment.

Next follows a description of a third embodiment according to the present invention. Referring now to a flowchart in FIG. 5, a description will be given of processing according to this embodiment where an instruction to drive the actuator in the interchangeable lens 100 is made in the above irregular situation and the lens power mode instructed by camera is not received from the camera body 200. The configurations of the camera body 200 and the interchangeable lens 100 in this embodiment are the same as those in the first embodiment, and the components common to those in the first embodiment will be designated by the same reference numerals as those in the first embodiment.

In the step S501, the camera CPU 206 transmits an actuator driving instruction (operation instruction of the interchangeable lens 100) to the lens CPU 114 in order to drive the magnification varying lens 102, the diaphragm 103, the image stabilization lens 104, or the focus lens 105. The lens CPU 114 receives an actuator driving instruction from the camera body 200 in the step S601.

Next, in the step S602, the lens CPU 114 receives the lens power mode instructed by camera from the camera CPU 206 according to the processing described with reference to FIG. 3, and determines whether the lens power mode corresponding to it has already been determined. If the lens power mode has already been determined, the lens CPU 114 proceeds to the step S604 and drives at least one of the zoom actuator 106, the aperture actuator 108, the image stabilization actuator 110, and the focus actuators 112 with the driving method and driving speed suitable for the determined lens power mode.

On the other hand, if it is determined in the step S602 that the lens power mode has not been determined, the lens CPU 114 sets the preset lens power mode described in the second embodiment. In the step S604, the actuator is driven with the driving method and driving speed suitable for the preset lens power mode. Thereafter, the lens CPU 114 ends this processing.

According to this embodiment, the interchangeable lens 100 can perform the minimum necessary operation even when the lens power mode instructed by camera is not received from the camera body 200.

Fourth Embodiment

Next follows a fourth embodiment according to the present invention. The first to third embodiments describe notifying the camera body 100 of one or more lens power modes illustrated in FIG. 4 stored in the power mode storage unit 116. When such a lens is a new type interchangeable lens and the old type interchangeable lens cannot notify its own lens power mode, a combination of the camera body 200 and the old type interchangeable lens cannot operate the old type interchangeable lens. Accordingly, the camera body 200 according to the fourth embodiment confirms the type of the interchangeable lens after the interchangeable lens is mounted, and changes the method of notifying the instructed power mode according to the confirmation result. Thereby, the user can use the camera body 200 regardless of the new and old types interchangeable lenses.

Figure 7:
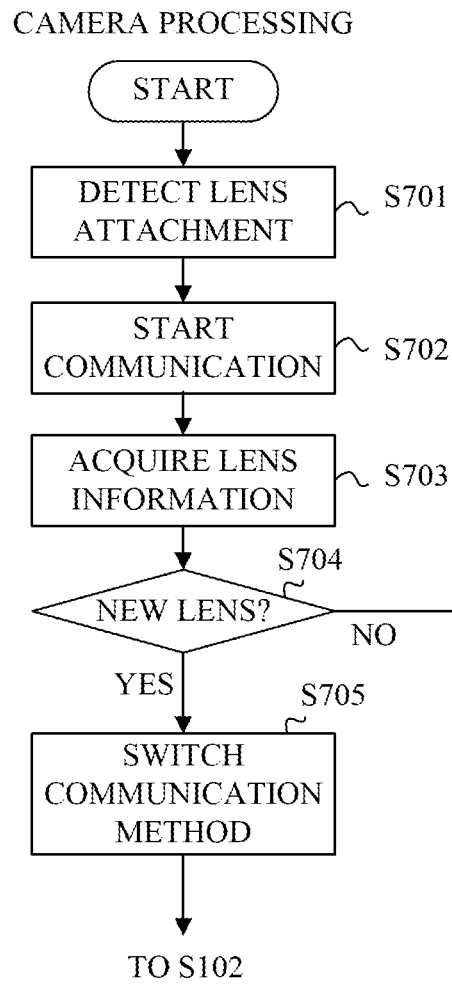
FIG. 7 is a flowchart showing processing performed by the camera body according to a fourth embodiment.

FIG. 7 is a flowchart showing startup processing performed by the camera CPU 206 in the camera body 200. This embodiment is different from the first embodiment in that the memory 230 in the camera body 200 stores a computer program for executing this startup processing illustrated in the flowchart of FIG. 7 instead of the computer program illustrated in the flowchart of FIG. 3. The other configuration is the same as that of the camera body 200 in the first embodiment, and the same components as those in the first embodiment will be designated by the same reference numerals.

In the fourth embodiment, the new type interchangeable lens 100 is compatible with the above asynchronous communication and clock synchronous communication synchronized with a clock signal, and can communicate with the camera body 200 in accordance with one of the selected communication methods. The old type interchangeable lens is incompatible with the asynchronous communication, and can communicate with the camera body 200 by the clock synchronization communication.

In the step S701 in FIG. 7, the camera CPU 206 detects that the interchangeable lens 100 is attached to the camera body 200. The detection method is as described in the first embodiment.

Next, in the step S702, the power is supplied to the lens CPU 114, and the communication with the lens CPU 114 starts. The power consumption in the communication is smaller than that used to drive various types of actuators, and even if power is supplied for the communication, the above overcurrent and the like do not occur. At the stage of the step S702, since the camera CPU 206 does not know whether the attached interchangeable lens is the new type or the old type, any of the interchangeable lenses can start the communication in accordance with the clock synchronous communication.

Next, in the step S703, the camera CPU 206 acquires lens information from the lens CPU 114. This processing is performed in order for the camera CPU 206 to determine whether the attached interchangeable lens 100 is the new type interchangeable lens or the old type interchangeable lens, such as a serial number of the attached lens, information representing the new type or the old type, and information representing a function installed only in the new type interchangeable lens. The information representing a function installed only in the new type interchangeable lens is, for instance, information on the compatibility of the asynchronous communication, and information representing an operation member installed only in the new type interchangeable lens.

Next, in the step S704, the camera CPU 206 determines whether the mounted interchangeable lens 100 is the new type interchangeable lens. If it is determined that it is the new type (Yes), the flow proceeds to the step S705, and if it is determined that it is not the new type (No), the flow proceeds to the step S706.

In the step S705, the camera CPU 206 switches the communication method from the clock synchronous communication to the asynchronous synchronous communication while cooperating with the lens CPU 114. Thereby, the subsequent control can provide a communication with the interchangeable lens 100 faster than the clock synchronous communication. After switching the communication method in the step S705, the same processing as that of the step S102 and subsequent steps in the first embodiment is performed.

On the other hand, when the flow proceeds to the step S706, the camera CPU 206 continues the clock synchronous communication without switching the communication method. The camera CPU 206 notifies the lens CPU 114 of the lens power mode instructed by camera consumable by the interchangeable lens without inquiring the mounted interchangeable lens of the power mode.

Then, in the step S707, the camera CPU 206 starts supplying the driving power from the camera body 200 to the interchangeable lens 100. In this case, the interchangeable lens 100 drives various types of actuators in accordance with the lens power mode instructed by camera.

If the interchangeable lens has a plurality of old types, such as an interchangeable lens compatible with a power mode A and an interchangeable lens compatible with a power mode B, the camera CPU 206 may notify the lens CPU 114 of the lens power mode instructed by camera corresponding to the lens information received in the step S703. When the lens information is unknown and thus the corresponding power mode is unknown, the camera CPU may not notify the mounted interchangeable lens of the power mode.

The user thus can use the camera body 200 by acquiring the lens information in the step S703, regardless of whether or not the interchangeable lens 100 stores one or more power modes. The power can be supplied to the new type interchangeable lens 100 according to the power mode for the new type interchangeable lens 100 similar to the first embodiment.

The flowchart illustrated in FIG. 7 discusses an example in which the camera CPU 206 executes the processing subsequent to the step S102 after the step S705, but may execute the processing described in the second or third embodiment after the step S705.

While this embodiment discusses the compatible communication methods different between the new type interchangeable lens and the old type interchangeable lens, the processing of the step S705 may be omitted if the compatible communication methods are the same between the new type interchangeable lens and the old type interchangeable lens.

Fifth Embodiment

Next follows a fifth embodiment according to the present invention. The fifth embodiment is different from the first to fourth embodiments in that the lens power mode instructed by camera initially transmitted from the camera CPU 206 to the lens CPU 114 is transmitted based on one or more lens power modes received from the lens CPU 114. The fifth embodiment will be described with reference to FIG. 6B.

The fifth embodiment assumes that the camera CPU 206 has requested the lens CPU 114 to transmit the lens power mode. Data 802 is one or more settable lens power modes. Data 803 transmitted by the camera CPU 206 to the lens CPU 114 in response to a detection of the start bit ST of the data 802 is response data indicating that the data 802 has been received.

The data 802 transmitted by the lens CPU 114 to the camera CPU 206 in response to a voltage level change of the next notice channel RTS is a signal that data is receivable from the camera CPU 206. In response to the detection of the start bit ST of data 804, the camera CPU 206 transmits, as data 805, the lens power mode instructed by camera determined based on the received lens power mode to the lens CPU 114. The ACT power determination unit 117 sets the lens power mode instructed by camera received in the data 805 to the power mode of interchangeable lens 100.

In the fifth embodiment, the lens power mode instructed by camera transmitted from the camera CPU 206 and the lens power mode settable by the lens CPU 114 never disagree with each other. Thus, it is unnecessary to reselect the lens power mode instructed by camera (step S105) in the first embodiment, and the power supply to the interchangeable lens 100 can be started earlier than intervening the step S105 in the first embodiment (step S106). It is thus possible for the user to shorten the standby time before the imaging becomes ready.

The communication method according to the fifth embodiment may be combined with that of the fourth embodiment.

Each of the above embodiments discusses an example in which one or more of lens power modes are transmitted and received by the asynchronous communication, but the data may be transmitted and received by the clock synchronous communication using the camera CPU 206 as a clock master. Then, the camera CPU 206 superimposes a clock signal on a communication line connecting the electric contacts 119a and 209a. A communication line connecting the electric contacts 119 and 209b is set to a communication line configured to transmit the data from the camera CPU 206 to the lens CPU 114, and a communication line connecting the electric contacts 119c and 209c is set to a communication line configured to transmit the data from the lens CPU 114 to the camera CPU 206. This full duplex communication can transmit and receive respective power modes of the lens CPU 114 and the camera CPU 206.

The above embodiment discusses the interchangeable lens 100 as an illustrative accessory apparatus, but may use another accessory apparatus, such as a flash (illumination) apparatus, which is detachably and communicatively mounted on the camera body.

Each of the above embodiments can properly set the operation power state of the accessory apparatus within the power supply range permissible by the imaging apparatus, while the imaging is quickly ready at the startup.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164778, filed on Sep. 3, 2018, which is hereby incorporated by reference herein in its entirety.

What is claimed is:

1. An imaging apparatus to which an accessory apparatus is detachably and communicatively attachable, the imaging apparatus comprising:
    a power supply unit configured to supply a power to the accessory apparatus;
    a camera control unit configured to control the power supply unit; and
    a camera communication unit configured to communicate with the accessory apparatus,
    wherein the camera communication unit receives, from the accessory apparatus, one or more settable power modes settable to the accessory apparatus and transmits, to the accessory apparatus, a request power mode corresponding to a power that the power supply unit can supply to the accessory apparatus,
    wherein the camera control unit determines whether any one of the one or more settable power modes corresponds to the transmitted request power mode, and
    wherein in a case where the camera control unit determines that any one of the one or more settable power modes corresponds to the transmitted request power mode, the power supply unit supplies the power corresponding to the transmitted request power mode.

2. The imaging apparatus according to claim 1, wherein the camera control unit selects another request power mode different from the transmitted request power mode in a case where none of the one or more settable power modes correspond to the transmitted request power mode, the another request power mode corresponding to any one of the one or more settable power modes.

3. The imaging apparatus according to claim 2, wherein the camera communication unit transmits, to the accessory apparatus, the another request power mode.

4. The imaging apparatus according to claim 1, wherein the power supply unit supplies a predetermined power, instead of supplying the power corresponding to the transmitted request power mode, to the accessory apparatus in a case where none of the one or more settable power modes corresponds to the transmitted request power mode.

5. The imaging apparatus according to claim 1, wherein the camera communication unit transfers transmits the request power mode selected from the one or more settable power modes.

6. The imaging apparatus according to claim 1, wherein at least a part of a period in which the camera communication unit transmits the request power mode to the accessory apparatus and at least a part of a period in which the camera communication unit receives the one or more settable power modes from the accessory apparatus are overlapped.

7. An accessory apparatus detachably and communicatively attachable to an imaging apparatus, the accessory apparatus comprising:
a power receiving unit configured to receive a power from the imaging apparatus;
an accessory control unit configured to control an operation of the accessory apparatus; and
an accessory communication unit configured to communicate with the imaging apparatus,
wherein the accessory communication unit transmits, to the imaging apparatus, one or more settable power modes settable to the accessory apparatus, and receives, from the imaging apparatus, a request power mode corresponding to a power that the imaging apparatus can supply to the accessory apparatus,
wherein the accessory control unit determines whether any one of the one or more settable power modes corresponds to the received request power mode, and
wherein in a case where the accessory control unit determines that any one of the one or more settable power modes corresponds to the received request power mode, the accessory control unit operates the accessory apparatus under the any one of the one or more settable power modes corresponding to the received request power mode.

8. The accessory apparatus according to claim 7, wherein in a case where none of the one or more settable power modes corresponds to the received request power mode, the accessory control unit operates the accessory apparatus under a power mode corresponding to another power mode different from the received request power mode, the another power mode corresponding to any one of the one or more settable power modes.

9. The accessory apparatus according to claim 7, wherein in a case where none of the one or more settable power modes corresponds to the received request power mode, the accessory control unit operates the accessory apparatus under a predetermined power mode selected from among the one or more settable power modes.

10. The accessory apparatus according to claim 7, wherein the accessory control unit operates the accessory apparatus under a predetermined power mode selected from among the one or more settable power modes in a case where an operation command for the accessory apparatus is received from the imaging apparatus without receiving the request power mode.

11. The accessory apparatus according to claim 7, wherein at least a part of a period in which the accessory communication unit receives the request power mode from the imaging apparatus and at least a part of a period in which the accessory communication unit transmits the one or more settable power modes to the imaging apparatus are overlapped.

12. A control method of an imaging apparatus to which an accessory apparatus is detachably and communicatively attachable, the control method comprising:
receiving, from the accessory apparatus, one or more settable power modes settable to the accessory apparatus and transmitting, to the accessory apparatus, a request power mode corresponding to a power that the imaging apparatus can supply to the accessory apparatus;
determining whether any one of the one or more settable power modes corresponds to the transmitted request power mode; and
supplying the power corresponding to the transmitted request power mode in a case where it is determined that any one of the one or more settable power modes corresponds to the transmitted request power mode.

13. A control method of an accessory apparatus detachably and communicatively attachable to an imaging apparatus, the control method comprising:
transmitting, to the imaging apparatus, one or more settable power modes settable to the accessory apparatus and receiving, from the imaging apparatus, a request power mode corresponding to a power that the imaging apparatus can supply to the accessory apparatus;
determining whether any one of the one or more settable power modes corresponds to the received request power mode; and
operating the accessory apparatus under any one of the one or more settable power modes corresponding to the received request power mode, in a case where it is determined that the any one of the one or more settable power modes corresponds to the received request power mode.

* * * * *